(12) United States Patent
Fortmann et al.

(10) Patent No.: US 8,692,419 B2
(45) Date of Patent: Apr. 8, 2014

(54) METHOD FOR OPERATING A WIND POWER PLANT WITH EXCESS VOLTAGE IN THE GRID

(75) Inventors: Jens Fortmann, Berlin (DE);
Heinz-Hermann Letas, Susel/Gross Meinsdorf (DE)

(73) Assignee: Repower Systems SE, Hamburg (DE)

( * ) Notice: Subject to any disclaimer, the term of this patent is extended or adjusted under 35 U.S.C. 154(b) by 356 days.

(21) Appl. No.: 12/595,544

(22) PCT Filed: Feb. 21, 2008

(86) PCT No.: PCT/EP2008/001337
§ 371 (c)(1),
(2), (4) Date: Oct. 12, 2009

(87) PCT Pub. No.: WO2008/125163
PCT Pub. Date: Oct. 23, 2008

(65) Prior Publication Data
US 2010/0207463 A1 Aug. 19, 2010

(30) Foreign Application Priority Data
Apr. 13, 2007 (DE) .......................... 10 2007 017 870

(51) Int. Cl.
*H02J 3/46* (2006.01)
(52) U.S. Cl.
USPC .......................................... 307/153
(58) Field of Classification Search
USPC ............................................ 307/153; 290/55
See application file for complete search history.

(56) References Cited

U.S. PATENT DOCUMENTS 6,924,565 B2    8/2005  Wilkins et al.
2004/0178639 A1*  9/2004  Wobben .......................... 290/44
(Continued)

FOREIGN PATENT DOCUMENTS

CA    2581917    4/2006
CN    1784823 A  6/2006
(Continued)

OTHER PUBLICATIONS

"REA generating plants connected to the high- and extra-high voltage network"; VDN Verband der Netzbetreiber VDN e.V.beim VDEW; Aug. 2004.
"Grid Code: High and extra high voltage;" E.On Netz GmbH, Bayreuth; Status: Apr. 1, 2006.
Grid-Code Kooperationsregeln fur die deutschen Ubertragungsnetzbetreiber DVG Deutsche Verbundgesellschaft, Jul. 1988 (English abstract included).

(Continued)

*Primary Examiner* — Stephen W Jackson
*Assistant Examiner* — Joseph Inge
(74) *Attorney, Agent, or Firm* — Rankin, Hill & Clark LLP

(57) ABSTRACT

A method is provided for operating a wind power plant (15-19) with a rotor-driven (25-29) electric generator (30) for delivering electric power to an electric grid (31) which provides a grid voltage in which, when excess voltage prevails in the grid (31), idle power from the wind power plant (15-19) is fed to the grid (31) in order to lower the voltage. A wind power plant is provided (15-19) with a rotor-driven electric generator (30) for delivering electric power to an electric grid (31) in which when excess voltage prevails in the grid idle power from the wind power plant (15-19) is fed to the grid (31) in order to lower the voltage. Monitoring occurs to determine whether within a predeterminable time a voltage was lowered to a predeterminable reference value and/or an idle current is delivered which is greater than or equal to a predeterminable idle current reference value.

28 Claims, 6 Drawing Sheets

(56) References Cited

U.S. PATENT DOCUMENTS

| | | | |
|---|---|---|---|
| 2005/0090937 A1 | | 4/2005 | Moore et al. |
| 2007/0052244 A1 | | 3/2007 | Hudson |
| 2007/0273155 A1 | * | 11/2007 | Barton et al. ............. 290/44 |
| 2008/0084070 A1 | * | 4/2008 | Teichmann et al. ......... 290/55 |
| 2008/0111424 A1 | | 5/2008 | Yeh |

FOREIGN PATENT DOCUMENTS

| | | | | |
|---|---|---|---|---|
| DE | 10206828 | | 8/2003 | |
| DE | 102004048339 | | 4/2006 | |
| DE | 102004048341 | | 4/2006 | |
| EP | 1386078 | | 4/2002 | |
| EP | 1386078 | | 2/2004 | |
| EP | 1752660 | | 2/2007 | |
| EP | 1752660 A1 | * | 2/2007 | |
| JP | 06165561 | * | 6/1994 | ........... H02P 5/408 |
| WO | 01/25630 | | 4/2001 | |
| WO | 0125630 | | 4/2001 | |
| WO | 02/086315 | | 10/2002 | |
| WO | 2006/069569 | | 7/2006 | |
| WO | 2006/120033 | | 11/2006 | |
| WO | 2006120033 | | 11/2006 | |

OTHER PUBLICATIONS

Netzanschlussregeln, technische and organisatorische Regeln fur den Netzanschluss innerhalb der Regelzone der PreussenElektra Netz GmbH & Co., KG, Dec. 1999 (English abstract included).
REG-D Operating manual (2007 and 2005).
Reg-D, Bedienungsanleitung.
EEG-Erzeugungsanlagen am Hoch-und Hochstspannungsnetz, Aug. 2004.
E-On Netzanschlussregeln Hoch-und Hochstspannung, Apr. 1, 2006.
I. Erlich and U. Bachmann; "Grid Code Requirements Concerning Connection and Operation of Wind Turbines in Germany".
Bachmann et al; "Advanced Grid Requirements for the Integration of Wind Turbines into the German Transmission System".
Tapia et al; "Reactive power control of wind farms for voltage control applications", Renewable Energy 29 (2004).
Grid-Code Kooperationsregeln fur die deutschen Ubertragungsnetzbetreiber; 1998.
Netzanschlussregeln Technische und organisatorische Regeln fur den Netzanschluss innerhalb der Regelzone der PreussenElektra Netz GmbH & Co. KG; Dec. 1, 1999.
Einspruchsschriftsatz der Einsprechenden 4 zum Stamm-patent EP 2 135 349.

* cited by examiner

METHOD FOR OPERATING A WIND POWER PLANT WITH EXCESS VOLTAGE IN THE GRID

BACKGROUND OF THE INVENTION

1. Field of the Invention

The invention concerns a method for operating a wind power plant with a rotor-driven electric generator for delivering electric power to an electric grid which provides a grid voltage in which, when excess voltage prevails in the grid, idle power from the wind power plant is fed to the grid in order to lower the voltage.

The invention further concerns a wind power plant with a rotor-driven electric generator for delivering electric power to an electric grid in which when excess voltage prevails in the grid idle power from the wind power plant is fed to the grid in order to lower the voltage.

2. Description of Related Art

From DE 10 2004 048 339 A1, a wind power plant is known which has a rotor, a generator driven by it with a power converter for feeding electric energy via a connection to an electric supply network and a control unit, where the control unit has converter controller. Here it is envisaged that the control unit has an input connector for a reference value of the voltage to deliver, in which an additional regulator is provided on the input of which the reference voltage is applied and on the output of which idle power reference values are output and applied to the converter controller. The additional regulator is designed to calculate idle power reference values from the signal for the reference voltage, to record with the help of a sensor, the actual voltage delivered by the wind power plant and, after comparison with the reference voltage, to correct the idle power reference values. This consequently links the setting of a desired power coefficient with a voltage stabilizing method. This enables full utilization of the idle power potential of the wind power plant without occurrence of damage due to excessive increasing voltage. Furthermore, this regulator has the advantage that it enables robust operation of the wind power plant with impulse-like voltage transients.

From EP 1 386 078 B1, a wind power plant and a method for operating a wind power plant are known in which idle power from the wind power plant is fed to the electrical grid and the idle power is specified by a phase angle phi, which describes an angle between the current and the voltage of the electric power fed. Thus the phase angle determines the idle power portion of the power delivered by the wind power plant; the phase angle phi is changed dependent on the level of at least one voltage measured on the grid, with the phase angle unchanged as long as the grid voltage is between a predetermined lower reference value and a predetermined upper reference value, where the lower voltage value is smaller than a reference voltage value and the predetermined upper voltage value is greater than a predetermined reference voltage value and where if the predetermined upper voltage value is exceeded or the voltage drops below the predetermined lower voltage value, the magnitude of the phase angle increases with a further increase or reduction in voltage.

BRIEF SUMMARY OF THE INVENTION

It is the object of the present invention to specify a reliable method for operating a wind power plant which in case of excess voltage in the grid provides for a separation of the wind power plant from the grid later than usual, wherein the electrotechnical and/or electric components of the wind power plant are effectively protected.

This object is solved by a method for operating a wind power plant with a rotor-driven electric generator for delivering electric power to an electric grid, which provides a grid voltage in which, when excess voltage prevails in the grid, idle power from the wind power plant can be fed to the grid in order to lower the voltage, where it is monitored whether within a predeterminable time the voltage was lowered to a predeterminable reference value and/or an idle current is delivered which is greater than or equal to a predeterminable idle current reference value.

A voltage is understood to be a voltage present between a connection of the wind power plant and/or a wind power park to the grid and a wind power plant, for example the generator of a wind power plant in the nacelle. Preferably, a voltage on the low voltage side of a transformer of a wind power plant or a wind power park is meant.

Preferably, idle power is fed to the grid only when a predeterminable range of excess voltage is exceeded. The electric components and/or devices of a wind power plant or wind power park are usually designed so that they can endure a certain range of excess voltages, for example 10% excess voltage, i.e. a grid voltage of 110% even for a longer period without damage. Monitoring of whether the voltage was reduced to a predeterminable reference value or a corresponding idle current is delivered, which is greater than or equal to a predeterminable idle current reference value, can thus be made dependent on whether a corresponding range of excess voltage was exceeded. For example, a critical excess can exist if an excess voltage of 20% is present for more than 20 ms. Basically, monitoring can start, for example, if a critical excess voltage is reached, such as greater than 110% of the nominal voltage. The start of monitoring can also be time-dependent.

Preferably, for the case that the predeterminable voltage reference value and/or the predeterminable idle current reference value was not reached, a signal is triggered for separating the wind power plant to protect the electric components of the wind power plant and/or of the wind power park from damage. Thus, the invention makes possible a method and a wind power plant with a regulator for passing through occasional excess voltage, which can also be referred to as "high voltage right through". This reduces the voltage loads of the components of a wind power plant and/or a wind power park. In particular, a wind power plant and/or a wind power park can remain on the grid longer with the inventive method and protection of all components from excess voltage is ensured. Furthermore, only minor, inexpensive adaptation of components is necessary.

Preferably, a first limit function of time-dependent predetermined voltage reference values and/or a second limit function of time-dependent predetermined inductive idle current reference values is provided. Consequently, not only one voltage reference value can be provided, but rather a plurality of voltage reference values and/or a plurality of idle current reference values, which can change as a function of time. Thus, for example, electric components of the wind power plant can tolerate relatively high excess voltage over a particular period, then however the excess voltage must be significantly reduced to avoid damage to the components. For this reason the voltage reference values can change in a time-dependent manner.

Preferably, no signal for separating the wind power plant from the grid is triggered as long as the voltage remains below the first limit function and/or the idle current remains above the second limit function.

Furthermore preferable is that a voltage regulator and/or idle current regulator be provided so that a relatively fast adjustment to the reference values is facilitated. Here, for example, a PID controller can be used or a PD regulator to enable faster adjustment. Alternatively, a smaller inductive part can also be provided in a PID controller.

It is particularly preferable if the point at which the signal for separating the wind power plant from the grid is triggered is dependent on a response time of a circuit breaker in order to make a sufficiently timely separation of the wind power plant or wind power park from the grid before a critical state for the components is reached, so that during the time of separation the components cannot be damaged as long as there is still a corresponding excess voltage present on the components.

If, preferably, monitoring is continued when the predeterminable voltage reference value and/or predeterminable idle current reference value is reached and in particular when a nominal voltage prevails on the grid, further secure operation of the wind power plant is possible. Preferably, idle power will continue to be fed to the grid beyond the predeterminable time until the voltage reaches a further predeterminable value. If the further predeterminable voltage value is reached, the delivery of idle power is reduced in such a way that the further predeterminable voltage value is not exceeded, making allowance for the problem that due to the reduced voltage the wind power plant can per se no longer detect whether the excess voltage in the grid is past. This is because the voltage is in a normal range of voltage for the grid after successful feeding of idle current, and the system no longer measures an excess voltage. Thus, further reduction of the voltage must now be awaited, possibly also below an allowed voltage range and/or below a further predeterminable voltage value, whereupon the idle current feed or idle power feed can then be terminated. The idle current feed or idle power feed should preferably not be cut off suddenly in the process, but rather ensue in such a way that renewed excess voltage is avoided, which is ensured by the preferred measure.

Preferably, at least one electric component of the wind power plant and/or a wind park does not perform switching operations or stops switching operations at a predeterminable crosstalk voltage of an excess voltage of the grid. This largely prevents damage to the wind power plant. Crosstalk voltage in the context of the invention is particularly understood as an excess voltage brought about by excess voltage in the grid. It is particularly preferable if at least one electric component of the wind power plant cannot be subject to a predeterminable crosstalk voltage of an excess voltage of the grid even briefly and/or at least one electric component, which performs a switching operation and is not designed for the excess voltage or crosstalk voltage, is supplied by an uninterruptible power supply. With the use of a familiar uninterruptable power supply which is connected upstream of the sensitive electric components and ensures that no excess voltage or crosstalk voltage of an excess voltage of the grid reaches the sensitive electric components, particularly efficient protection of these sensitive components is possible. The other components which are not so sensitive require no uninterruptable power supply. If a crosstalk voltage of an excess voltage of the grid is present at the input of the uninterruptible power supply, the uninterruptible power supply switches off the conduction of the voltage and changes to battery operation to continue supplying the sensitive components with voltage and/or power.

Preferably, the method according to the invention is carried out for a maximum predeterminable time period. After that the process is terminated and in particular with continued presence of excess voltage, the wind park and/or wind power plant is separated from the grid.

Preferably, a method for operating a wind power park with at least two wind power plants is provided, in which a method according to the invention described above is used.

Preferably, a park regulator controls a park idle current source, with which in addition to the respective idle power of the wind power plant further idle power can be made available. The desired voltage reduction is thus supported via the controller and/or regulator of an idle current source set apart from the wind power plants. The additional idle current source or park idle current source can be a phase shifter or bank of capacitors.

The object is furthermore solved by a wind power plant with a rotor-driven electric generator for delivering electric power to an electric grid in which, when excess voltage prevails in the grid, idle power from the wind power plant can be fed to the grid in order to lower the voltage, where a monitoring device is provided which is designed to monitor whether within a predeterminable time, the voltage was lowered to a predeterminable reference value and/or an idle current is delivered which is greater than or equal to a predeterminable idle current reference value.

Preferably, the monitoring device is constructed in such a way that only upon exceeding a predeterminable range of excess voltage idle power is fed to the grid. For a predeterminable range of excess voltage in the context of the invention, it is particularly understood that a time-dependent function of the excess voltage is provided, above which the idle power is then fed to the grid. Preferably the monitoring device triggers a signal for separating the wind power plant from the grid if the predeterminable voltage reference value and/or the predeterminable idle current reference value is not reached. Furthermore preferable is the provision of a regulating device with which voltage regulation and/or idle current regulation is possible. Here, as previously described, it is preferably a PID regulating device or PD regulating device and/or a PID regulating device with a lower integral part.

The inventive wind power plant is particularly simple to implement if a power converter or a power converter and generator system is provided which feeds an idle current to the grid for lowering the voltage. Preferably, an uninterruptible power supply (UPS) is provided, which protects at least one sensitive electrical device or a sensitive electric component of the wind power plant from excess voltage.

Furthermore preferable is that the rotor circuit and/or stator circuit be constructed with a circuit breaker or contactor designed for excess voltage. It is particularly preferable, if separate switches are provided, for the rotor circuit and stator circuit so that these can also be switched separately. Preferably, the generator is a doubly fed asynchronous induction generator. An asynchronous induction generator or synchronous generator can also be provided which feeds the entire power to the grid via a power converter. Furthermore, an asynchronous induction generator can be provided which is directly coupled to the grid, where equipment, such as one or more power converters or switchable inductors, is provided in the wind power plant or in the wind park, which is designed to change the idle power of the wind power plant and/or of the wind park. It is furthermore preferable that the converter be an indirect converter, where it is particularly preferable that the indirect converter have at least one switchable resistance in an intermediate circuit and/or an electrical connection to the generator, and the resistance is activated if the power, the voltage and/or current present, which passes through the power converter reaches a predeterminable limit value in each case. The resistances here are preferably power resistors which are designed to accommodate the power of the generator in case of malfunctions in order to protect the power converter.

Preferably, a wind power park is provided with at least two inventive wind power plants as described previously. Preferably, a park idle current source is provided which is spaced apart from the wind power plants, which is controlled or regulated by a park regulator.

In the context of the invention the term "idle current" includes an additional one to the idle current ordinarily fed to the grid, where the idle current fed in normal operation before the excess voltage is also added to the idle current cited in the invention. As part of the invention, in place of the fed idle power, idle current can also be fed, the phase angle of the idle current changed accordingly or a power factor varied, i.e. electric analog variables for idle power used, which describe and define the portion or magnitude of the idle power to deliver.

According to the invention, a method for operating a wind power plant as well as a wind power plant are specified, which is self-monitoring and determines whether a necessary lowering of voltage takes place in time when an excess voltage occurs in the grid and whether the voltage reduction is large enough.

BRIEF DESCRIPTION OF THE DRAWINGS

The invention is described below based on examples of embodiments with reference to the drawings without thereby limiting the general scope of the inventive concept. Explicit reference is made to the drawings for all inventive details not explained further in the text. These show in.

DETAILED DESCRIPTION OF THE INVENTION

In the figures that follow, in each case the same or similar elements or corresponding parts bear the same reference numbers so that a corresponding redundant presentation is avoided.

With wind power plants, it is usual that with grid voltages of 110% of the nominal voltage the wind power plant is separated from the high voltage grid to protect the components of the wind power plant. The excess voltages or crosstalk voltages of excess voltages occurring in wind power plants are usually the result of events in the high voltage grid. This can, for example, be the shedding of an inductive load.

Figure 1:
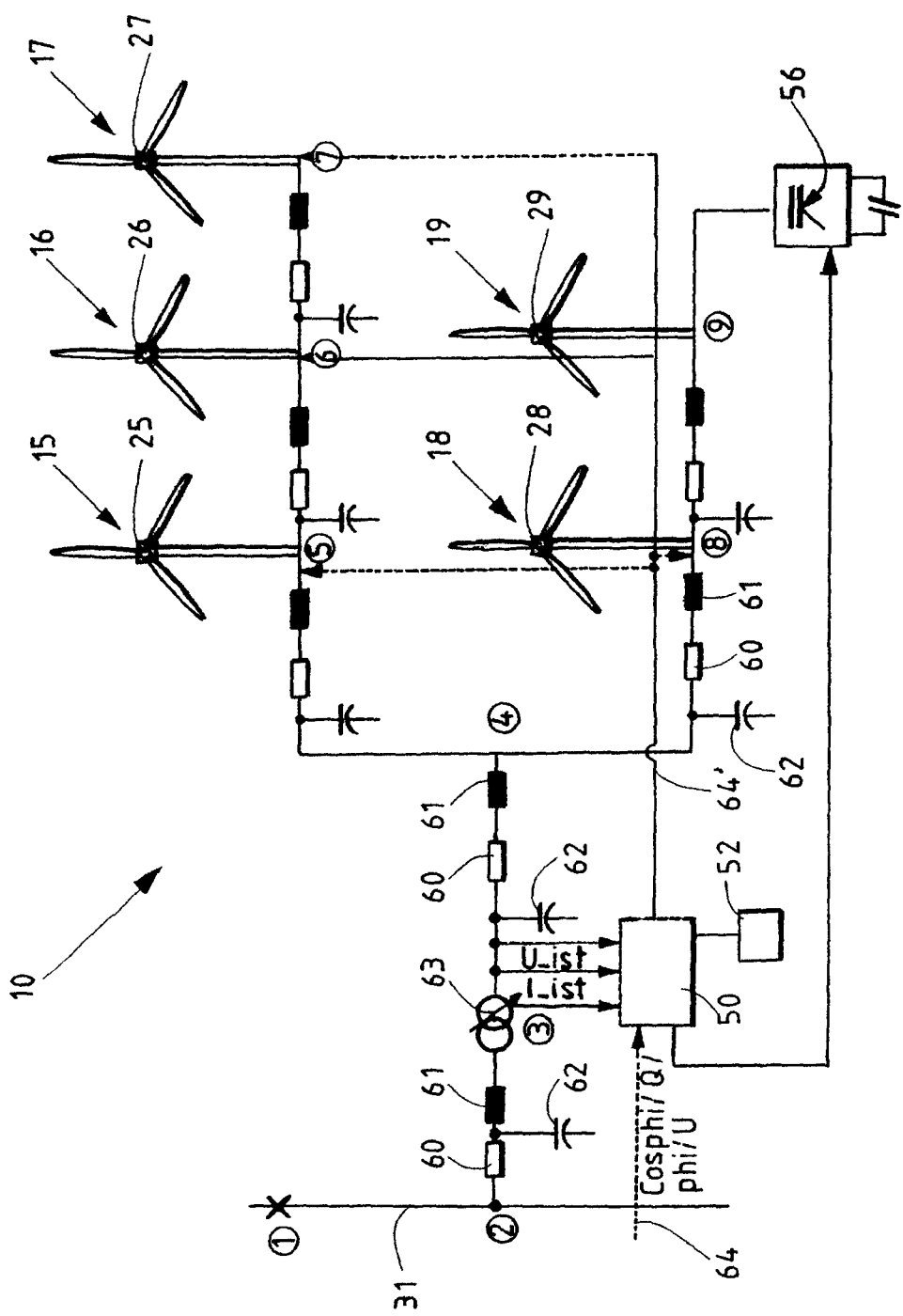
FIG. 1 a schematic representation of a wind park with a connection to the high voltage grid.

FIG. 1 shows a schematic of a wind park 10 with five wind power plants 15 to 19, in which the wind park 10 is connected to the grid 31 or high voltage grid 31. The voltage-raising event can lie at point or location 1 or points or location 2, for example.

Figure 3:
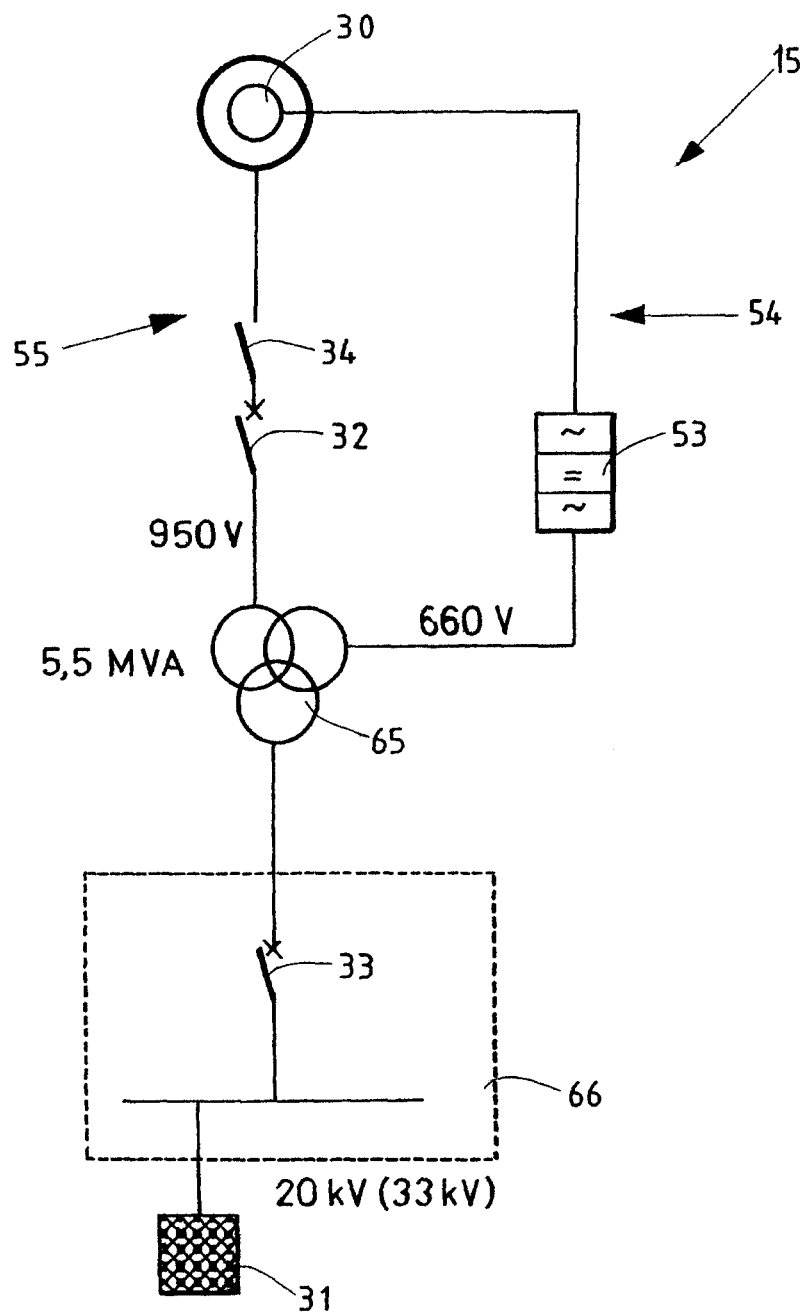
FIG. 3 a schematic representation of a wind power plant.

Between the place of the fault, respectively location 1 or 2, at which the voltage-raising event occurs, and wind power plants 15 to 19 or the wind power park 10 there now exists another series of inductors due to the feed lines which are indicated as a kind of equivalent network diagram in FIG. 1 with 61. The inductors, respectively coils 61, can be both the feed lines in the high and medium voltage grid as well as the high voltage transformer 63, which is constructed as a step transformer 63. On their side the wind power plants 15 to 19 are connected with the medium voltage grid of the wind park with a transformer 65, which, for example, can be designed as a two-winding transformer or three-winding transformer. In FIG. 3, for example, a three-winding transformer 65 is shown. Examples of typical values of the voltage drop at the transformers are 12% for the high voltage transformer 63 and 6% to 10% for the medium voltage transformer 65. Further voltage drops occur, for example, via a power choke and the generator, which is provided with the reference number 30 in FIG. 3, for example. With feeding of idle current at the 50% or 100% level, voltage reduction of 6% or 12% can be achieved at the high voltage transformer and approximately 3% to 5% or 6% to 10% at the medium voltage transformer.

An excess voltage at location 1 now leads to increased voltages and crosstalk voltages at the locations 3 to 9.

The wind power plants 15 to 19 from FIG. 1 are provided with corresponding rotors 25 to 29, with which in each case a generator 30, shown schematically in FIG. 3 for example, produces current or power. FIG. 1 also shows the resistances 60 and capacitors 62 schematically to represent the line resistances and line inductances. A reference specification is shown with 64, which specifies the cosine of the phase phi, the idle power Q, the phase angle phi itself and the voltage for the park regulator 50. These values are usually specified by the network operator of the high voltage grid 31. Remaining input variables for the park regulator 50 are the measured actual current (I_ist) and the actual prevailing voltage (U_ist) between the step transformer 63 and the wind power plants 15 to 19. Furthermore, an uninterruptible power supply 52 (UPS) is provided to protect sensitive components of the park regulator 50 from crosstalk voltage and/or excess voltages.

Furthermore, an idle current source 56 or park idle current source is provided which is external and/or at a distance from the wind power plants 15-19 which can be designed as a phase shifter formed and controlled or regulated by the wind park regulator 50.

Figure 2:
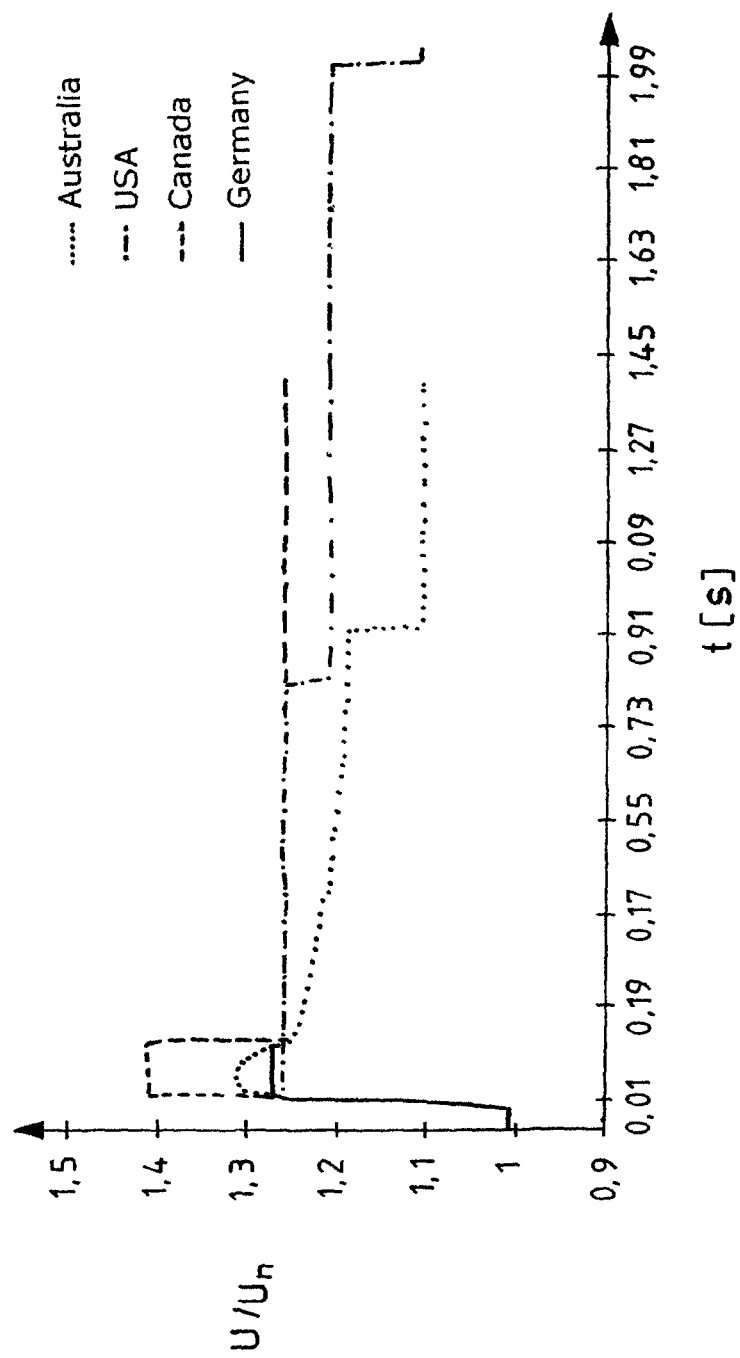
FIG. 2 a schematic representation of a diagram of the relative voltage versus time, which depict the requirements of network operators for the capability of wind power plants.

FIG. 2 shows a schematic representation of requirements of network operators for wind power plant capability to go through occasional excess voltages in the grid 31.

Due to the increasing proportion of wind power plants for energy supply in high voltage grids, the requirement of network operators to facilitate support of the high voltage grid 31 by wind power plants or wind power parks is increasing, and in fact particularly with excess voltage in the high voltage grid 31. The requirements of the network operators, shown in FIG. 2 as examples, indicate for example in Germany that over a time of 0.1 s an excess voltage of 126% is to be borne without disconnection from the power grid. In FIG. 2 this is shown schematically with the solid line. The relative voltage U in relation to the nominal voltage $U_n$ is shown and its time dependence in units of seconds. The requirements in Canada are even stricter. Here excess voltage of 140% is to be tolerated for 0.1 s and thereupon up to an elapsed time of 1.4 s after the occurrence of the excess voltage event a further excess voltage of 125%. This is indicated by the dashed line. The specifications in Australia are correspondingly different, as shown by the dotted line, and the US has other requirements yet again, as shown by the dot and dash line.

FIG. 3 shows a wind power plant schematically with various switches 32 to 34. A generator 30 produces, for example, a corresponding voltage of 950 V in the stator circuit 55 and 660 V in the rotor circuit 54. A power converter 53 is provided in the rotor circuit 54. A three-winding transformer 65 with a capacity of 5.5 MVA or 5.5 MW transforms these voltages to 20 kV and 33 kV. This high voltage is then made available to the grid 31 via the tower base 66. A circuit breaker 32 is provided which can separate the wind power plant 15 from the grid in time before a critical condition is reached which can lead to damage of the components of the wind power plant. The contactor 33 in the tower base can be used accordingly for this. Switch 34 is a kind of synchronization switch, which connects the wind power plant 15 to the grid if there is a phase balance between the grid voltage or grid current and the voltage or current made available by the wind power plant.

Now if in the case of a voltage increase, a feed of inductive or under-excited idle power occurs, this leads to a voltage drop at the inductances of the wind power plant or wind power park. In this way, particularly in stationary operation, the voltage at the wind power plants can be lowered versus the voltage at the site of the error. In particular the crosstalk voltage in the wind power plant or wind power park can be reduced. An example for the implementation of such a regulator using voltage statics is shown schematically in FIG. 4. Here regulation for reducing voltage of a generator/power converter system or of a power converter on a wind power plant is shown in the case of an excess voltage, i.e. feeding of inductive and/or under-excited idle power.

Figure 4:
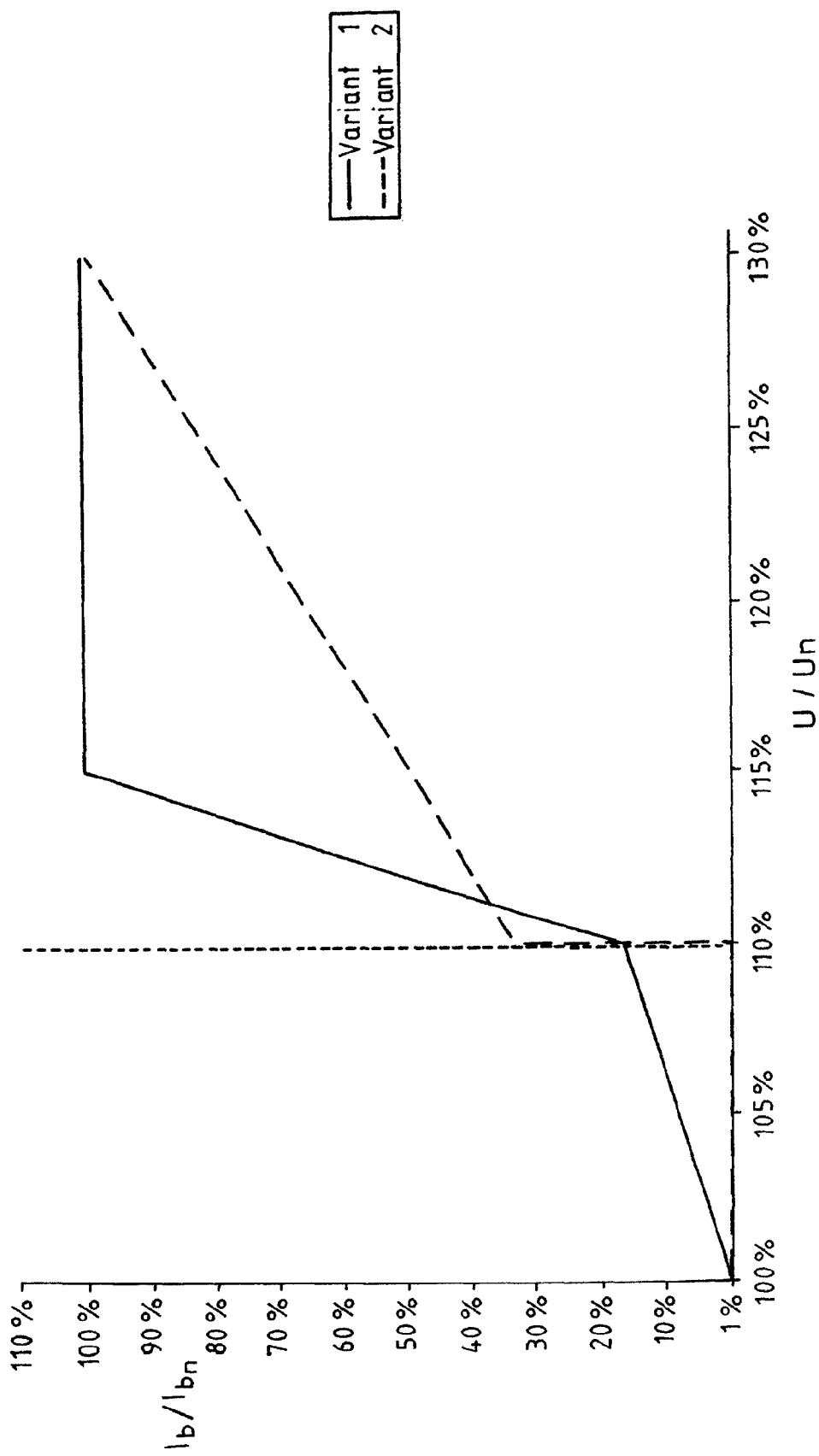
FIG. 4 a schematic representation of voltage statics, i.e. a diagram of a relative idle current versus a relative voltage.

In FIG. 4 a diagram is shown of the idle current in the ratio to nominal idle current as a function of relative voltage, i.e. the actual voltage divided by the nominal voltage. There are two variants shown in FIG. 4, specifically the first variant with a solid line and the second variant with a dashed line. The variant 1 of the voltage statics represents a regulation alternative with which in a normal range of voltage, i.e. with an excess voltage to 110% in the ration to the nominal voltage, a voltage-dependent delivery of idle power takes place, which counteracts a voltage increase of a wind power plant and with a further voltage increase beyond the voltage range, i.e. beyond 110% U/Un the idle power feed will be increased considerably, causing the maximum idle current value to be reached relatively quickly. This variant is preferably used if the effect of the delivery of idle power on the voltage is small, i.e. with a fixed grid or if it is to be ensured that the voltage is to be kept below a particular and/or predeterminable voltage.

Alternatively, variant 2 shows regulation with which in the normal voltage range, up to 110%, no change of the delivery of idle power is made in response to voltage changes, and when the voltage range is exceeded, regulation suddenly occurs to a value corresponding to an appropriate delivery of idle power, where if there is a further voltage increase of a linear function of the statics in this case, the delivery of idle power is increased. This variant is advantageous if a bearable voltage is already achieved by the jump and the function then ensures that the rising voltage is compensated by higher delivery of idle power. Here, the function with which the delivery of idle power is increased should correspond approximately to the effect on the voltage. This here is a case of a so-called "soft grid". Of course different variants are possible, in particular also non-linear functions in the ranges where linear functions are shown.

Figure 5:
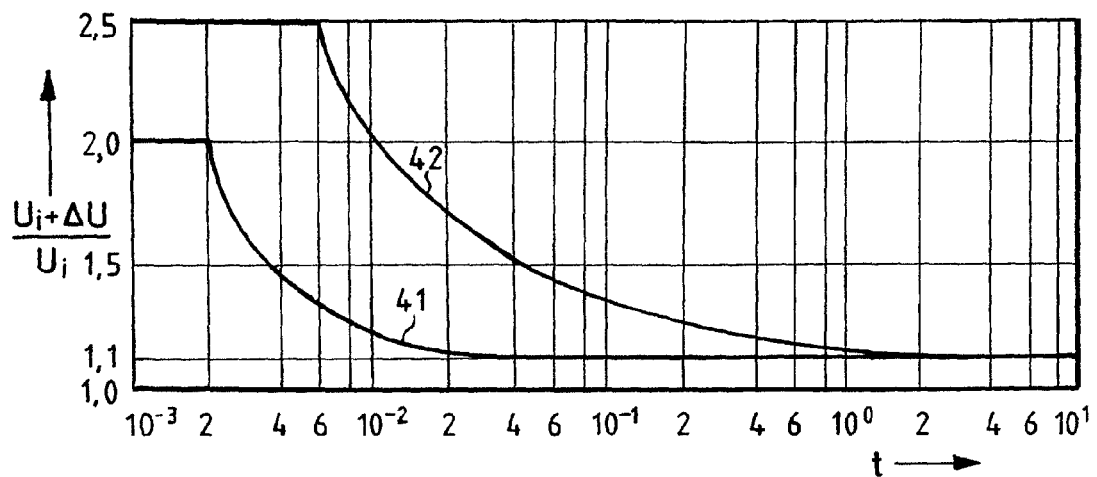
FIG. 5 a schematic representation of voltage curves versus time.

If the fault is in the high voltage grid 31 and/or there is excess voltage which lies above a predeterminable excess voltage value at which damage can occur to components of the wind power plant, the problem is now faced that along with operation of the wind power plant, i.e. feeding power to the grid, sufficient protection must continue to be ensured. In order not to provide corresponding electrical devices with too much excess voltage, it is to be ensured that the area in FIG. 5 shown below the second voltage function 42 for the operation of the wind power plant is not left in an upward direction. FIG. 5 accordingly shows a schematic representation of a voltage function versus time, in which $(U_i+\Delta U)/U_i$ is on the y-axis, where $U_i$ is a peak value of a rated insulation voltage and $\Delta U$ an overlaid, non-periodic voltage peak.

In the area below the second voltage curve 42, a wind power plant can consequently be operated with excess voltage if no switching operations are performed under load. To perform switching operations under load it must be ensured that the wind power plant within the area shown under the second voltage function 42 is separated from the grid. Below the first voltage function 41 switching operations under load can be performed without further ado. FIG. 5 represents a corresponding standard for switching devices (the standard IEC 60439-1).

According to this standard, it is possible, for example, to go through a permitted excess voltage of approx. 140% without switching operations on the part of the wind power plant, where after one second the excess voltage must be reduced to approx. 10% in order not to overload the electrical components.

According to the invention, the wind power plant and/or a monitoring device of the wind power plant detects an excess voltage and accordingly feeds idle power for lowering the voltage. The lowering of the voltage is monitored and, if there is concern regarding exceeding the limit lines or first voltage function 41 or second voltage function 42, the system will be separated from the grid. This preferably occurs taking into account the response time of the circuit breaker used, for example of the circuit breaker 32 from FIG. 3 or the contactor 33 from FIG. 3 and there also under load as necessary. Since excess voltages can also be present for longer periods, if a corresponding grid fault is present, for example, and the separation of the wind power plant from the grid occurs for example with a time delay of 40 ms to 100 ms depending on the switch type, higher dimensioning of the electric strength of the electrical components of the wind power plant or of the wind power park would be de facto necessary, because for reasons of protection, a signal for separation would have to occur at the beginning of the fault so that the wind power plant is separated in a timely manner should the fault or excess voltage persist for a longer period.

Figure 6:
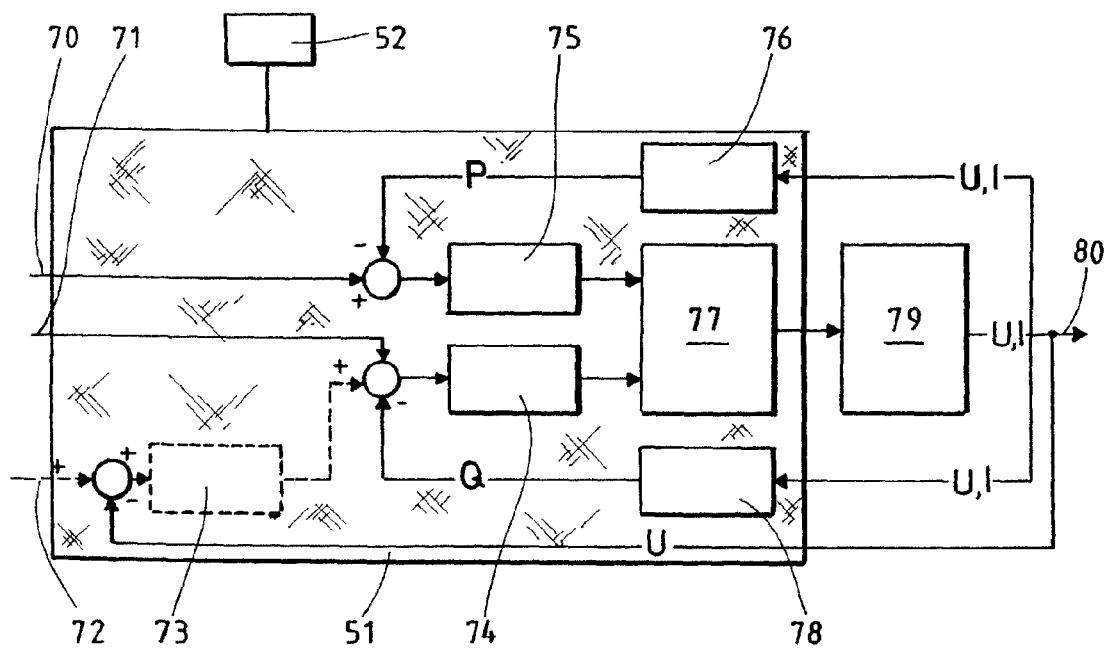
FIG. 6 a schematic representation of a regulating device for a wind power plant.

Here, the inventive solution takes effect so that in the case of excessive voltage in the grid 31 a power converter or generator/power converter system with, for example, a regulating device 51, as shown in the simplified schematic in FIG. 6, in accordance with the voltage statics according to FIG. 4, for example, an inductive idle current will be fed to the grid 31 in order to lower the voltage in the wind power plant or in the wind power park. It is then also preferable that an operating control signal prevents components that are directly affected by the voltage increase and are not designed for operation at a higher voltage from performing switching operations that could lead to damage of the components.

Monitoring is performed to check whether the regulator is fast enough, for example that within 30 ms after the start of the event or start of the excess voltage, an adequately high idle current is delivered, for example a value of 90% of the final value or whether the voltage could be lowered sufficiently to a desired value within this time. Sufficient lowering can, for example, be lowering to or below a permitted predeterminable value or to a value within a permitted voltage/time area.

Figure 7:
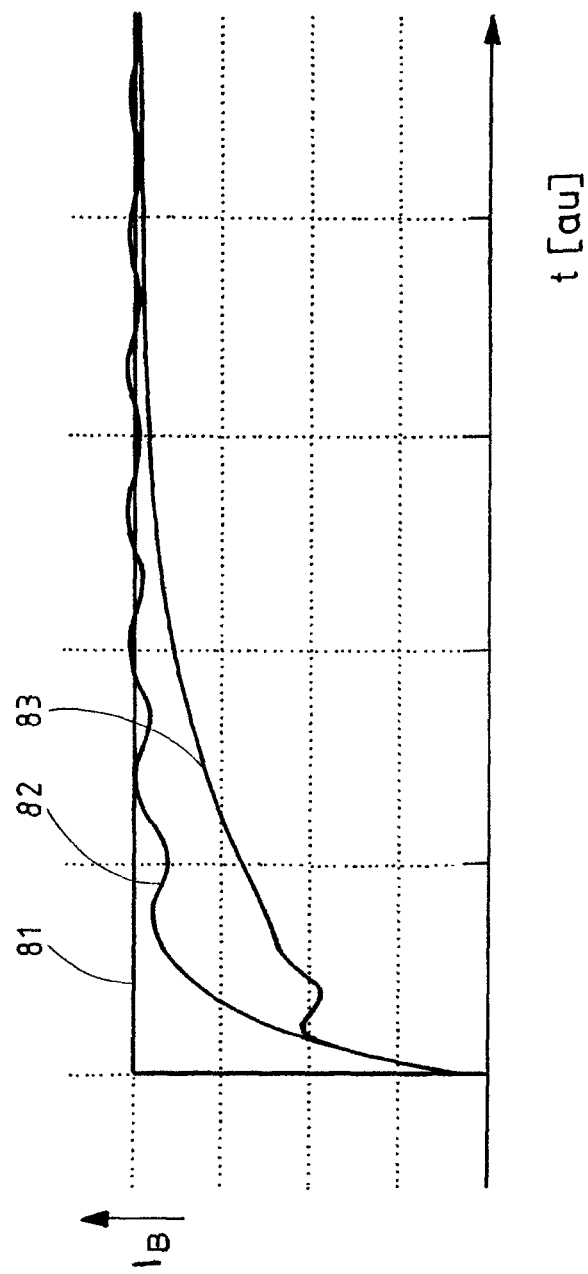
FIG. 7 a schematic representation of the idle current versus time.

A schematic representation of regulation of an adequately high idle current $I_B$ is shown in FIG. 7 as a function of time in arbitrary units (au). An idle current reference value is represented by 81. A first idle current actual value curve is 82, and a second idle current actual value curve is 83. The adjustment of the idle current according to the curve 82 is sufficient in this embodiment to feed a sufficiently high idle current with sufficient feed. Curve 83 shows a progression representing regulation that is too slow, which could be due to the integral part of a PID controller used being too large, for example.

If no sufficient voltage reduction occurs or no sufficient current was fed, a malfunction of the wind power plant or an unusual event in the high voltage grid 31 must be assumed. In this case a signal is triggered for separating the wind power plant from the grid by an upstream switch or a switch with sufficient breaking capacity, such as circuit breaker 32 or the contactor 33, in order to ensure that a separation from the grid occurs before a critical time is reached, such as 100 ms at 130% nominal voltage of a separation of the wind power park occurs and the voltage on the corresponding components again consequently lies in the permitted range.

If a sufficient voltage reduction occurs, then the wind power plant or wind power park can continue to be operated. Despite a fault on the high voltage side, the voltage on the wind power plant and therefore for the components of the wind power plant is lowered to permitted values, which also makes it possible to go through significantly longer faults or excess voltages present as higher voltage progressions than would be permitted according to the standard for switching devices, for example 120% excess voltage for one second. In order to continue protecting the wind power plant or the wind power park, continued monitoring of the limit values is provided, which triggers a shut-down of the wind power plant if defined voltages or a predetermined voltage curve are exceeded or a defined voltage/time area is left. It is also envisaged to arrange sensitive devices after a UPS 52 which is able to be operated continuously under excess voltage. The UPS can effectively prevent increases in voltage from being passed on if it is connected between the grid 31 and the corresponding components. This way components can also be supplied which cannot be operated with excess voltage even briefly or components can be supplied which must switch during a period of excess voltage but are not designed for doing so.

It is sufficient according to the invention, as indicated in FIG. 3, to provide a circuit breaker 32 and/or a protection 33 in the rotor circuit and/or network power inverter connection for a wind power plant with a doubly fed asynchronous induction generator if there are separate switches for the stator circuit and rotor circuit and if the circuit breaker and/or the contactor in the rotor circuit is dimensioned to be able to switch at higher voltage.

FIG. 6 shows a schematic representation of a voltage regulator of a wind power plant with a regulating device 51, of which at least some parts or one part is securely supplied with voltage by a UPS 52, where a corresponding excess voltage protection is then also given. Input variables for the regulating device 51 are a predeterminable effective power maximum 70, an idle power reference value 71 and a voltage reference value 72. The voltage reference value 72 is compared with an output voltage U. The difference and/or comparative amount is fed to a voltage regulator 73 and leads to a regulated Voltage, which together with a comparison of the idle power calculated from the voltage and current in an idle power calculation 78 and the idle power reference value leads to a control parameter for the idle power regulator 74, which is an input variable for the set point module 77. On the other side, the maximum predetermined power 70 serves as a reference for an effective power calculated from the delivered current or the delivered voltage in the effective power calculation 76. The difference value for this is fed to an effective power regulator 75. The result of this is also used as an input variable for the set point module 77. Corresponding decoupling parameters, limit parameters, switching operations, etc. are calculated and controlled in the set point module 77. The output of the regulating device 51 goes into a power converter or a power converter/generator system 79. Based on that, a corresponding voltage and corresponding current U and I are delivered in direction 80 to grid 31 and/or to a transfer point for grid 31.

Preferably, for determining the time for triggering the signal for separating the wind power plant from the grid, an excess voltage switch-off curve, which has been determined empirically, is provided. For this, it is particularly preferable to have stored in the memory of a regulating device or computer a model in the form of a database which is used for operating the wind power plant and parts thereof. In particular a characteristic data field for operation of the wind power plant in the range of excess voltage is provided, in which it is also particularly preferable that at least one response time of at least one circuit breaker is taken into account. This way the characteristic data field for operation has key operating risk data which make safe operation of the wind power plant with excess voltage in the high voltage grid possible. Thus, the wind power plant can also continue to be operated at high excess voltage, with the components of the wind power plant protected from excess voltage and in particular with only a few components having to be designed for greater electrical strength. Furthermore, the wind power plant is protected from high mechanical stresses in the case of "crowbar" ignitions with excess voltage, because the generator voltage is reduced.

DRAWING REFERENCE LIST 1-9 Location
10 Wind power park
15-19 Wind power plant
25-29 Rotor
30 Generator
31 Grid
32 Circuit breaker
33 Contactor
34 Switch
41 First voltage function
42 Second voltage function
50 Park regulator
51 Regulating device
52 Uninterruptible power supply (UPS)
53 Power converter
54 Rotor circuit
55 Stator circuit
56 Idle current source
60 Resistance
61 Coil
62 Capacitor
63 Step transformer
64 Reference value specification
64' Reference value specification
65 Three-phase current transformer
66 Tower base
70 Effective power maximum
71 Idle power reference value
72 Voltage reference value
73 Voltage regulator
74 Idle power regulator
75 Effective power regulator 76 Effective power calculation
77 Set point module
78 Idle power calculation
79 Power converter/generator
80 to the grid
81 Idle current reference value
82 First idle current actual value curve
83 Second idle current actual value curve
t Time
P Effective power
Q Idle power
U Voltage
I Current
$I_b$ Idle current
$I_{bn}$ Nominal idle current
phi Phase
$U_n$ Nominal voltage

The invention claimed is:

1. A method for operating a wind power plant (15-19) with a rotor-driven (25-29) electric generator (30) for delivering electric power to an electric grid (31), which provides a grid voltage, comprising the steps of:
when excess voltage prevails in the grid (31), idle power from the wind power plant (15-19) is fed to the grid (31) in order to lower the voltage,
monitoring whether within a predeterminable time the voltage was lowered to a predeterminable voltage reference value, and
monitoring whether an idle current is delivered which is greater than or equal to a predeterminable idle current reference value,
wherein for the case that the predeterminable voltage reference value and/or the predeterminable idle current reference value is not achieved within the predeterminable time, a signal for separating the wind power plant (15-19) from the grid (31) is triggered, and
wherein a first time (t) dependent limit function (42) of predetermined voltage reference values and a second limit function of time (t) dependent predetermined inductive idle current reference values is provided.

2. A method according to claim 1, wherein only when a predeterminable range of excess voltage is exceeded will idle power be fed to the grid (31).

3. A method according to claim 1, wherein no signal is triggered for separating the wind power plant (15-19) from the grid as long as the voltage remains below the first limit function (42) and/or the idle current remains above the second limit function.

4. A method according to claim 3, wherein idle power continues to be fed to the grid (31) beyond the predeterminable time until the voltage reaches a further predeterminable value.

5. A method according to claim 1, wherein a voltage regulator and/or idle current regulator is provided.

6. A method according to claim 1, wherein time for triggering the signal to separate the wind power plant (15-19) from the grid (31) is dependent of a response time of a circuit breaker (32, 33).

7. A method according to claim 1, wherein the monitoring is continued if the predeterminable voltage reference value and/or predeterminable idle current reference value is reached and if a nominal voltage prevails on the grid (31).

8. A method according to claim 1, wherein idle power continues to be fed to the grid (31) beyond the predeterminable time until the voltage reaches a further predeterminable value.

9. A method according to claim 8, wherein when the further predeterminable value of the voltage is reached, the delivery of idle power is reduced in such a way reduced that the further predeterminable value of the voltage is not exceeded.

10. A method according to claim 1, wherein at least one electric component (34, 50, 51) of the wind power plant (15-19) and/or a wind park (10) does not perform switching operations and/or stops switching operations at a predeterminable crosstalk voltage of an excess voltage of the grid (31).

11. A method according to claim 1, wherein at least one electric component (34, 50, 51) of the wind power plant must not be exposed to a predeterminable crosstalk voltage of an excess voltage of the grid (31) even briefly and/or at least one electric component (34, 50, 51), which performs a switching operation and is not designed for the excess voltage or crosstalk voltage, is supplied by an uninterruptible power supply (52).

12. A method according to claim 1, wherein the method is carried out for a maximum predeterminable time period.

13. A method for operating a wind power park with at least two wind power plants (15-19), in which a method according to claim 1 is carried out.

14. A method according to claim 13, wherein a park regulator (50) controls a park idle current source (56).

15. A wind power plant (15-19) comprising:
a rotor-driven (25-29) electric generator (30) for delivering electric power to an electric grid (31) in which when excess voltage prevails in the grid (31) idle power from the wind power plant (15-19) can be fed to the grid (31) in order to lower the voltage, and
a monitoring device (50,51) which is designed to monitor whether within a predeterminable time the voltage was lowered to a predeterminable voltage reference value and an idle current is delivered which is greater than or equal to a predeterminable idle current reference value,
wherein for the case that the predeterminable voltage reference value and/or the predeterminable idle current reference value is not achieved within the predeterminable time, the monitoring device (50,51) triggers a signal for separating the wind power plant (15-19) from the grid (31), and
wherein a first time (t) dependent limit function (42) of predetermined voltage reference values and a second limit function of time (t) dependent predetermined inductive idle current reference values is provided.

16. A wind power plant (15-19) according to claim 15, wherein the monitoring device (50, 51) is designed in such a way that only when a predeterminable range of excess voltage is exceeded will idle power be fed to the grid (31).

17. A wind power plant (15-19) according to claim 15, wherein a regulating device (51) is provided which enables voltage regulation and/or idle current regulation.

18. A wind power plant (15-19) according to claim 15, further comprising a power converter (53) or a power converter and generator system (30, 53) which feeds an idle current to the grid (31) to lower the voltage.

19. A wind power plant (15-19) according to claim 15, further comprising an uninterruptible power supply (52) which protects at least one sensitive electric device (50, 51) or one sensitive electric component (34) from excess voltage.

20. A wind power plant (15-19) according to claim 15, wherein a rotor circuit (54) and/or stator circuit (55) are constructed with a circuit breaker (32) or contactor (33) designed for excess voltage.

21. A wind power plant (15-19) according to claim 20, wherein separate switches (32, 33, 34) are provided for the rotor circuit (54) and stator circuit (55).

22. A wind power plant (15-19) according to claim 15, wherein the generator (30) is a doubly fed asynchronous induction generator.

23. A wind power plant (15-19) according to claim 18, wherein the power converter (53) is an indirect converter.

24. A wind power plant (15-19) according to claim 23, wherein the indirect converter (53) has at least one switchable resistance in an intermediate circuit and/or an electrical connection to the generator (30), and the resistance is activated if the power, the voltage and/or current present, which passes through the power converter (53) reaches a predeterminable limit value in each case.

25. A wind power park (10) with at least two wind power plants (15-19) according to claim 15.

26. A wind power park (10) according to claim 25, wherein a park idle current source (56) is provided which is spaced apart from the wind power plants (15-19).

27. A method for operating a wind power plant (15-19) with a rotor-driven (25-29) electric generator (30) for delivering electric power to an electric grid (31), which provides a grid voltage, comprising the steps of:
when excess voltage prevails in the grid (31), idle power from the wind power plant (15-19) is fed to the grid (31) in order to lower the voltage that is present between a connection of the wind power plant (15-19) and/or a wind power park (10) to the grid (31) and the generator (30) of the wind power plant (15-19),
monitoring whether within a predeterminable time the voltage was lowered to a predeterminable voltage reference value, and
monitoring whether an idle current is delivered which is greater than or equal to a predeterminable idle current reference value, wherein only when a predeterminable range of excess voltage is exceeded will idle power be fed to the grid (31).

28. A wind power plant (15-19) comprising:
a rotor-driven (25-29) electric generator (30) for delivering electric power to an electric grid (31) in which when excess voltage prevails in the grid (31) idle power from the wind power plant (15-19) can be fed to the grid (31) in order to lower the voltage that is present between a connection of the wind power plant (15-19) and/or a wind power park (10) to the grid (31) and the generator (30) of the wind power plant (15-19), and
a monitoring device (50,51) which is designed to monitor whether within a predeterminable time the voltage was lowered to a predeterminable voltage reference value and an idle current is delivered which is greater than or equal to a predeterminable idle current reference value, wherein the monitoring device (50, 51) is designed in such a way that only when a predeterminable range of excess voltage is exceeded will idle power be fed to the grid (31).

* * * * *